United States Patent
Kim et al.

(10) Patent No.: US 9,544,525 B2
(45) Date of Patent: Jan. 10, 2017

(54) DIGITAL BROADCAST RECEIVER AND METHOD OF UPDATING CHANNEL INFORMATION

(71) Applicant: SAMSUNG ELECTRONICS CO., LTD., Suwon-si (KR)

(72) Inventors: Mun-seok Kim, Seoul (KR); Kyung-chul Nam, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/171,813

(22) Filed: Feb. 4, 2014

(65) Prior Publication Data

US 2014/0226076 A1    Aug. 14, 2014

(30) Foreign Application Priority Data

Feb. 13, 2013 (KR) .................. 10-2013-0015525

(51) Int. Cl.
| | | |
|---|---|---|
| H04N 7/173 | (2011.01) | |
| H04N 5/50 | (2006.01) | |
| H04N 21/434 | (2011.01) | |
| H04N 5/44 | (2011.01) | |
| H04H 60/25 | (2008.01) | |
| H04H 60/41 | (2008.01) | |
| H04N 21/438 | (2011.01) | |

(Continued)

(52) U.S. Cl.
CPC ............. *H04N 5/50* (2013.01); *H04H 60/25* (2013.01); *H04H 60/41* (2013.01); *H04H 60/73* (2013.01); *H04N 5/4401* (2013.01); *H04N 21/4345* (2013.01); *H04N 21/4383* (2013.01); *H04N 21/47202* (2013.01); *H04N 21/485* (2013.01); *H04N 21/6118* (2013.01)

(58) Field of Classification Search
CPC ...................... H04N 21/2225; H04N 21/47202; H04N 21/47208
USPC ................................... 348/725; 725/87, 101
See application file for complete search history.

(56) References Cited

U.S. PATENT DOCUMENTS

| | | | | |
|---|---|---|---|---|
| 6,978,471 | B1 * | 12/2005 | Klopfenstein | ......... H04N 7/163 348/E5.002 |
| 2004/0019910 | A1 * | 1/2004 | Grenier | ................ H04N 21/235 725/70 |

(Continued)

FOREIGN PATENT DOCUMENTS

| | | |
|---|---|---|
| EP | 2 227 007 A2 | 9/2010 |
| EP | 2 525 567 A2 | 11/2012 |

(Continued)

OTHER PUBLICATIONS

Communication dated Jun. 6, 2014 issued by the European Patent Office in counterpart European Application No. 14153169.9.

(Continued)

*Primary Examiner* — Brian Yenke
*Assistant Examiner* — Omer Khalid
(74) *Attorney, Agent, or Firm* — Sughrue Mion, PLLC

(57) ABSTRACT

A digital broadcast receiver is provided, including a receiver which receives a plurality of broadcast signals, a channel scanner which scans the plurality of broadcast signals and acquires service information (SI) related to the plurality of broadcast signals, and a controller which selects a broadcast signal having a preset type of SI from among the acquired SI, and updates channel information.

19 Claims, 5 Drawing Sheets

(51) Int. Cl.
*H04N 21/472* (2011.01)
*H04N 21/485* (2011.01)
*H04N 21/61* (2011.01)
*H04H 60/73* (2008.01)

(56) References Cited

U.S. PATENT DOCUMENTS

| | | | |
|---|---|---|---|
| 2007/0146555 A1 | 6/2007 | Wada | |
| 2008/0305757 A1* | 12/2008 | Jang | H04H 60/43 |
| | | | 455/150.1 |
| 2009/0150933 A1 | 6/2009 | Lee et al. | |
| 2010/0231809 A1* | 9/2010 | Suzuki | 348/731 |
| 2010/0321589 A1 | 12/2010 | Jang et al. | |
| 2013/0081098 A1* | 3/2013 | Klughart | H04N 5/76 |
| | | | 725/153 |
| 2013/0254694 A1* | 9/2013 | Lee | H04N 21/47815 |
| | | | 715/769 |
| 2014/0130109 A1 | 5/2014 | Zhang et al. | |

FOREIGN PATENT DOCUMENTS

| | | |
|---|---|---|
| EP | 2 701 396 A1 | 2/2014 |
| JP | 2006-13765 A | 1/2006 |
| WO | 2012/142758 A1 | 6/2014 |

OTHER PUBLICATIONS

Communication dated Nov. 16, 2016, issued by the European Patent Office in counterpart European Application No. 14153169.9.

\* cited by examiner

DIGITAL BROADCAST RECEIVER AND METHOD OF UPDATING CHANNEL INFORMATION

CROSS-REFERENCE TO RELATED APPLICATIONS

This application claims priority from Korean Patent Application No. 10-2013-0015525, filed on Feb. 13, 2013, in the Korean Intellectual Property Office, the disclosure of which is incorporated herein by reference, in its entirety.

BACKGROUND

Field

Apparatuses and methods consistent with the exemplary embodiments relate to a digital broadcast receiver and a method of updating channel information. More particularly, the exemplary embodiments relate to a digital broadcast receiver capable of selecting a broadcast signal according to the type of service information (SI) of the received broadcast signal and providing a channel, and a method of updating channel information.

Description of the Related Art

Recently, broadcast media have converted from analog to digital due to many operational and structural advantages of using the digital method. The digital method is more resistant to noise than conventional analog signals, can use error correction technology and can enable drastic band compression of video and audio signals. Accordingly, broadcast media have been rapidly digitalized around the world.

Currently, digital broadcasts are mostly based on MPEG-2 coding, the broadcasts extract metadata from a transferred broadcast stream and provide channel information (or service information (SI)) related to the broadcast stream.

The SI is defined as program and service information protocol (PSIP) by extending program specific information (PSI) of an MPEG-2 system by the Advanced Television System Committee (ATSC) which is a digital broadcast standard based on MPEG-2 (ATSC A/65 PSIP).

In a known video on demand (VOD) service, channel information of a broadcast stream is provided to the user using PSI of the MPEG-2 system, whereas in a digital cable broadcast service, channel information of a broadcast stream is provided using PSIP according to the ATSC A/65 standard.

However, a known digital broadcast receiver does not distinguish PSI and PSIP but scans and organize all the channels uniformly so that specially used channels, such as VOD services, cannot be distinguished. For this reason, in diverse digital broadcast environments, the receiver may organize an unintended broadcast service (for example, an unscrambled VOD adult broadcast channel) as a channel.

SUMMARY

Exemplary embodiments overcome the above disadvantages and other disadvantages not described above. Also, the exemplary embodiments are not required to overcome the disadvantages described above, and an exemplary embodiment may not overcome any of the problems described above.

The inventive concept provides a digital broadcast receiver which selects a broadcast signal according to the type of SI of the received broadcast signal and provides channels so as to prevent reception of an unintended broadcast service, and a method for updating channel information.

According to an aspect of the exemplary embodiments, a digital broadcast receiver includes a receiver configured to receive a plurality of broadcast signals, a channel scanner configured to scan the plurality of broadcast and acquire service information (SI) related to the plurality of broadcast signals, and a controller configured to select a broadcast signal having a preset type of SI from among the acquired SI, and updating channel information.

The channel scanner may acquire the service information by scanning the plurality of broadcast signals in a predetermined cycle.

The SI may include at least one of program specific information (PSI)-type information, and program and service information protocol (PSIP)-type information.

The controller may select the broadcast signal having the PSIP-type information from among the acquired SI, and update the channel information.

The digital broadcast receiver may further include a user interface which receives selection of channel mode, wherein the controller is configured to select the broadcast signal according to a type of SI which corresponds to the selected channel mode, and updates the channel information.

The channel mode may include cable channel mode and video on demand (VOD) channel mode.

When the cable channel mode is selected, the controller may select the broadcast signal having the PSIP-type information and may update the channel information.

When the VOD channel mode is selected, the controller may select the broadcast signal having the PSI-type information and may update the channel information.

The receiver may include a tuner configured to tune the plurality of broadcast signals, and a demodulator configured to demodulate the plurality of tuned broadcast signals.

According to another aspect of the exemplary embodiments, a method of updating channel information using a digital broadcast receiver includes receiving a plurality of broadcast signals, scanning the plurality of broadcast signals and acquiring service information (SI) of the plurality of broadcast signals, and selecting a broadcast signal having a preset type of SI from among the acquired SI, and updating the channel information.

In the acquiring service information (SI), the plurality of broadcast signals may be scanned in a predetermined cycle.

The SI may include at least one of program specific information (PSI)-type information, and program and service information protocol (PSIP)-type information.

In the updating operation, the channel information may be updated by selecting the broadcast signal having the PSIP-type information from among the acquired SI.

The method may further include receiving selection of channel mode, and in the updating operation, the channel information is updated by selecting the broadcast signal according to a type of SI which corresponds to the selected channel mode.

The channel mode may include cable channel mode and video on demand (VOD) channel mode.

In the updating operation, when the cable channel mode is selected, the channel information may be updated by selecting the broadcast signal having the PSIP-type information.

In the updating operation, when the VOD channel mode is selected, the channel information may be updated by selecting the broadcast signal having the PSI-type information.

The receiving operation may include tuning the plurality of broadcast signals, and demodulating the plurality of tuned broadcast signals.

According to yet another aspect of the present exemplary embodiments, a non-transitory computer readable storage medium, when implemented on a computer, may cause a processor of the computer to execute a method of updating channel information using a digital broadcast receiver, the method including scanning a plurality of broadcast signals in a predetermined cycle and acquiring service information (SI) of the plurality of broadcast signals, and selecting a broadcast signal having a preset type of SI from among the acquired SI and updating the channel information.

Additional and/or other aspects and advantages of the will be set forth in part in the description which follows and, in part, will be obvious from the description, or may be learned by practice of the invention.

BRIEF DESCRIPTION OF THE DRAWINGS

The above and/or other aspects of the exemplary embodiments will be more apparent by reference to the accompanying drawings, in which.

DETAILED DESCRIPTION OF THE EXEMPLARY EMBODIMENTS

Figure 1:
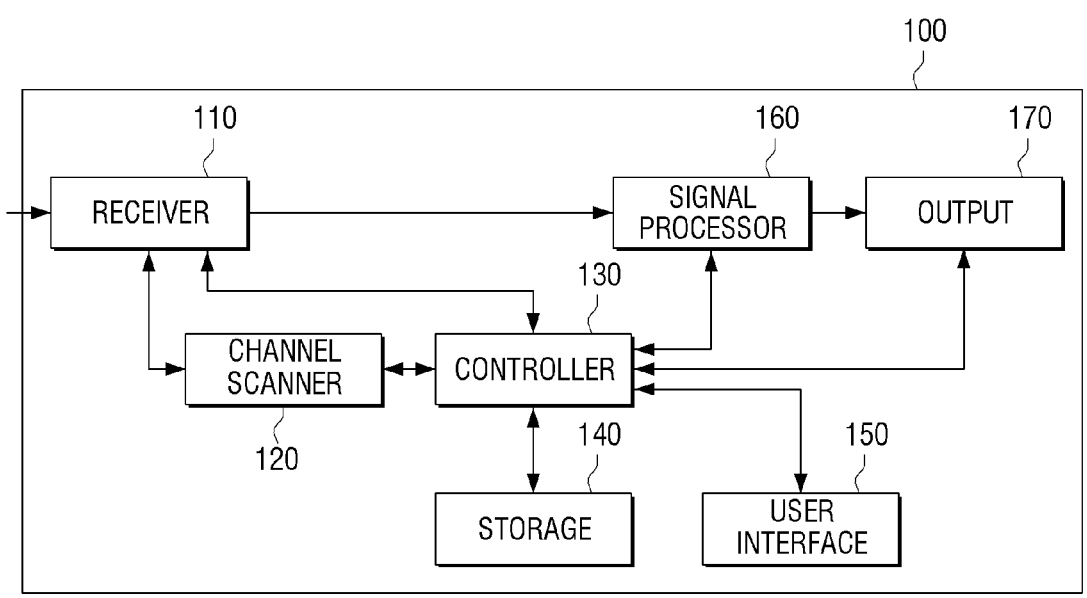
FIG. 1 is a block diagram of a configuration of a digital broadcast receiver, according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the invention with unnecessary detail.

FIG. 1 is a block diagram of a configuration of a digital broadcast receiver 100 according to an exemplary embodiment.

With reference to FIG. 1, the digital broadcast receiver 100 may include a receiver 110, a channel scanner 120, a controller 130, a storage 140, a user interface 150, a signal processor 160, and an output 170.

The receiver 110 receives a plurality of broadcast signals. More specifically, the receiver 110 may receive broadcast signals related to a plurality of channels which are externally transferred. The receiver 110 may include a tuner configured to tune a broadcast signal, and a demodulator configured to demodulate a tuned broadcast signal. Detailed description of the tuner and the demodulator will be provided below with reference to FIG. 2.

The receiver 110 may receive a broadcast signal of a channel selected by the user from among a plurality of broadcast signals, according to control of the controller 130, and may transmit the broadcast signal to the signal processor 160.

The plurality of broadcast signals are digital broadcast signals, which may be transmitted from a digital broadcast transmitter. General digital broadcast signals may be generated by the following process.

A video signal and an audio signal which constitute a broadcast program are individually encoded and compressed to be converted into a video elementary stream (ES) and an audio elementary stream (ES) which are the basis of digital data. In addition, the ES s are packetized and multiplexed and converted into a transport stream (TS) of a transportable format. Subsequently, the TS is channel-coded and modulated for transmission to become a broadcast signal and is transferred to a receiver.

The channel scanner 120 scans a plurality of broadcast signals in a predetermined cycle, and acquires SI of the plurality of broadcast signals.

The SI indicates information needed for de-multiplexing the multiplexed TS, and information regarding contents and kinds of diverse programs provided by broadcast services. That is, the SI may include broadcast channel information, broadcast signal coding information and electronic program guide (EPG) information.

The types of the SI include program specific information (PSI) of an MPEG-2 system (ISO/IEC 13818-1 Sections) to classify programs, and program system information protocol (PSIP) of ATSC A/65 which includes network information and EPG information which are transferred to terrestrial, cable, and satellite etc.

In Europe, digital video broadcast-service information (DVB-SI) of DVB standard, instead of the PSIP, is regulated.

The PSI contains information through which the receiver de-multiplexes and decodes a particular stream in a multiplexed TS. The PSI includes a program association table (PAT), a conditional access table (CAT), a program map table (PMT), and a network information table (NIT).

Among them, the PAT includes a packet identifier (PID) of the PMT which corresponds to diverse kinds of broadcast signals provided by a transmitter. Accordingly, the PAT allocates a packet of the TS to each broadcast signal, that is, a program. In addition, since the PMT has a PID of a packet of the TS which transmits the broadcast signal together with the type of each broadcast signal, the PMT indicates the packet in which each video, audio, and data are loaded.

The PSIP contains information related to a channel and EPG information regarding each program. The PSIP includes a system time table (STT), a rating region table (RRT), a master guide table (MGT), a virtual channel table (VCT), an event information table (EIT) and an extended text table (ETT). A PID which is recognized as the PSIP from a TS of MPEG-2 is 0xFFB. In response to the 0xFFB being decoded, a VCT can be obtained. The VCT may know whether the corresponding table is a MGT, an STT, an RRT, or a VCT by checking the table_id of the corresponding packet. Once the VCT is extracted and decoded, PIDs of audio and video streams of the broadcast signal may be obtained so that an individual broadcast program can be de-multiplexed. Accordingly, reception is possible without the PAT and the PMT of the PSI, but the ATSC standard regulates that PSI is concurrently transmitted for compatibility with MPEG-2.

Additional description of the PSI and the PSIP is given in ISO/IEC 13818-1 sections and ATSC A/65 PSIP standard, and thus, is omitted here.

The channel scanner 120 regularly scans channels through which a plurality of broadcast signals enter, and acquires SI by filtering a data signal from the scanned broadcast signals. The acquired SI is transmitted to the controller 130.

The controller 130 selects a broadcast signal having a preset type of SI from among the acquired SI and updates channel information. The types of SI may include PSIP/PSI type, PSI type, and PSIP type.

The controller 130, according to an exemplary embodiment, may select a broadcast signal having PSIP-type information and update channel information. The PSIP-type information indicates SI having the table of the PSIP, and may include PSIP/PSI type and PSIP type. In response to the controller 130 operating in this manner, VOD services are not organized as channels in digital cable broadcasting. This is because in the digital cable broadcasting, VOD services uses only PSI of the MPEG-2 system as SI, whereas general cable broadcast services use PSIP-type or PSIP/PSI-type SI.

Accordingly, when the user does not want to organize VOD services as channel information but only wants to use general cable broadcasting services, the controller 130 selects a broadcast signal having PSIP-type SI and updates the channel information.

More specifically, in order to determine the type of SI of a broadcast signal, the controller 130 may parse 0xFFB packet of the TS of the broadcast signal, and only determine that the SI is PSIP type, when there is a VCT.

The controller 130 according to an exemplary embodiment may select a broadcast signal according to the type of SI corresponding to channel mode selected through the user interface 150 and may update channel information. More specifically, the user may select the channel mode through the user interface 150. The channel mode may include cable channel mode and VOD channel mode.

When the cable channel mode is selected, the controller 130 may select a broadcast signal having PSIP-type information and update channel information.

When the VOD channel mode is selected, the controller 130 may only select a broadcast signal having PSI-type information and update channel information.

The controller 130 controls operation of the components of the digital broadcast receiver 100.

The storage 140 stores acquired SI of a broadcast signal. In addition, the storage 140 stores channel information updated by the controller 130.

The storage 140 stores a Basic Input/Output System (BIOS), an operating system, and diverse programs and data such as applications.

The user interface 150 receives selection of the channel mode. The user interface 150 receives a control command from an input means such as physical buttons in order to input a control command or from a wireless input means such as a remote controller, and transmits the control command to the controller 130.

The signal processor 160 receives a broadcast signal of a channel selected by the controller 130 from the receiver 110, and processes the broadcast signal to be output. More specifically, the signal processor 160 may de-multiplex a TS of a broadcast signal to be output and decode the de-multiplexed video and audio streams using SI.

The signal processor 160 may include a de-multiplexer, a video decoder, and an audio decoder. Detailed description of the signal processor 160 will be given below with reference to FIG. 2.

The output 170 outputs the processed broadcast signal. More specifically, according to the control of the controller 130, the output 170 displays the decoded video stream and outputs the decoded audio stream.

The output 170 may include a display and a speaker.

The digital broadcast receiver as shown in FIG. 1 selects a broadcast signal according to the type of the SI and provides channels so that reception of unintended broadcast services may be prevented.

Figure 2:
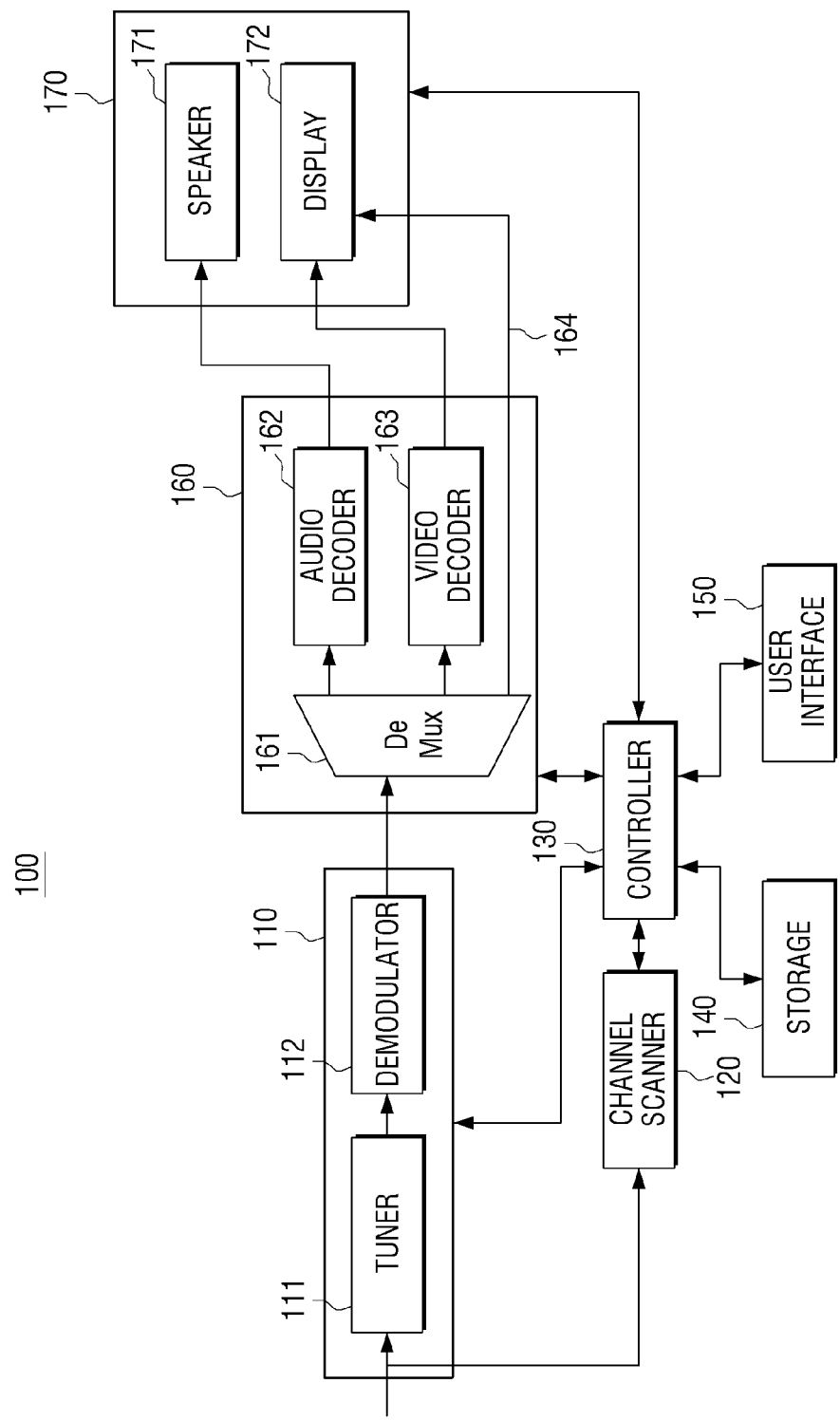
FIG. 2 is a block diagram of a specific configuration of a digital broadcast receiver, according to an exemplary embodiment.

FIG. 2 is a block diagram of a specific configuration of a digital broadcast receiver according to an exemplary embodiment.

Since the channel scanner 120, the controller 130, the storage 140, and the user interface 150 have been described above with reference to FIG. 1, their description is not repeated.

With reference to FIG. 2, the receiver 110 may include a tuner 111 and a demodulator 112.

The tuner 111 tunes and receives a broadcast signal.

The demodulator 112 receives and demodulates the tuned signal. More specifically, digital cable broadcasting uses Quadrature Amplitude Modulation (QAM), and digital terrestrial broadcasting uses Vestigial Side Band (VSB) modulation. Accordingly, the demodulator 112 may employ different modulation methods according to the type of a received broadcast signal.

The signal processor 160 may include a de-multiplexer 161, an audio decoder 162, and a video decoder 163.

The de-multiplexer 161 de-multiplexes a TS of a broadcast program to reproduce using acquired SI so that a video ES, an audio ES, and data may be separated. More specifically, according to a broadcast channel selected through the user interface 150, the controller 130 may control operation of the de-multiplexer 161 using (EPG) information of stored SI.

The audio decoder 162 and the video decoder 163 decode an audio ES and a video ES respectively, and transmit the decoded ESs to the output unit 170.

In addition, the de-multiplexer 161 extracts a data stream 164 and transmits the data stream to the output unit 170.

The output unit 170 may include a speaker 171 and a display 172.

The speaker 171 outputs the decoded audio signal, and the display 172 displays the decoded video signal.

The digital broadcast receiver as shown in FIG. 2 selects a broadcast signal according to the type of SI of a received broadcast signal and provides channels so that reception of unintended broadcast services may be prevented and a broadcast channel selected by the user may be appropriately reproduced.

Figure 3:
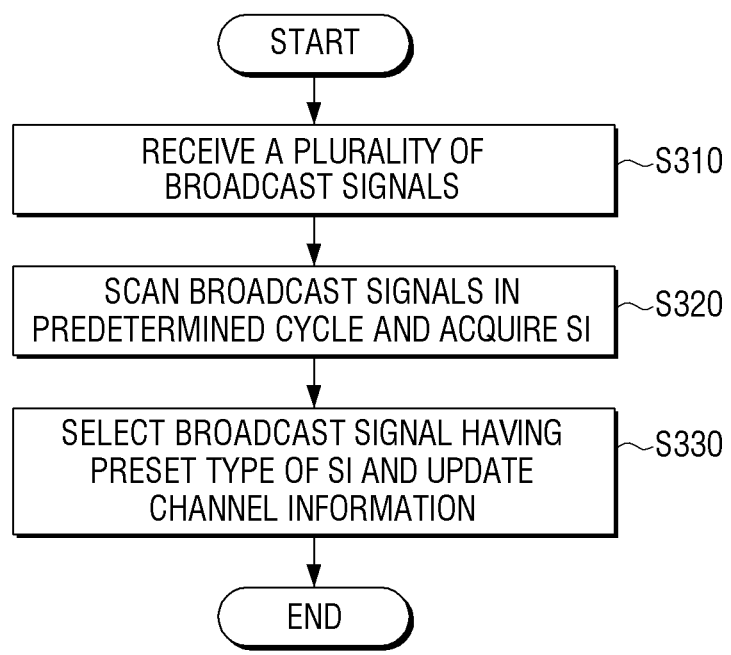
FIGS. 3 and 4 are flowcharts which illustrate a method of updating channel information using a digital broadcast receiver, according to exemplary embodiments.
Figure 4:
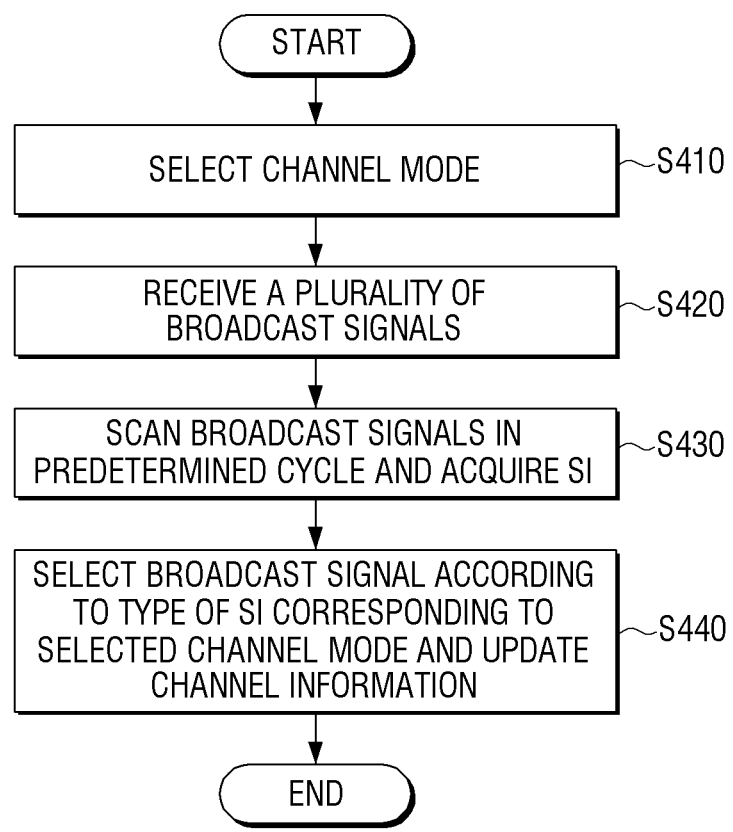

FIGS. 3 and 4 are flowcharts which illustrate a method of updating channel information using a digital broadcast receiver, according to exemplary embodiments.

With reference to FIG. 3, in operation of S310, a digital broadcast receiver 100, according to an exemplary embodiment, receives a plurality of broadcast signals.

In the receiving operation, the plurality of broadcast signals are tuned, demodulated, and received.

In operation of S320, the digital broadcast receiver 100 scans the plurality of broadcast signals in a predetermined cycle, and acquires SI of the plurality of broadcast signals.

The SI may include at least one of PSI-type information and PSIP-type information. More specifically, the SI indicates information needed for de-multiplexing the multiplexed TS, and information regarding contents and kinds of diverse programs provided by broadcast services. That is, the SI may include broadcast channel information, broadcast signal coding information and EPG information.

In operation of S330, after acquiring the SI, the digital broadcast receiver 100 selects a broadcast signal having a preset type of SI from among the acquired SI and updates the channel information. The types of SI may include PSIP/PSI type, PSI type and PSIP type.

When updating the channel information, the digital broadcast receiver 100 may select a broadcast signal having PSIP-type information from among the acquired SI and may update the channel information.

The PSIP-type information indicates SI having the table of the PSIP, and may include PSIP/PSI type and PSIP type.

This is because in the digital cable broadcasting, VOD services uses only PSI of the MPEG-2 system as SI, whereas general cable broadcast services use PSIP-type or PSIP/PSI-type SI. Accordingly, when the user does not want to organize VOD services as channel information but rather only wants to use general cable broadcasting services, the digital broadcast receiver 100 selects a broadcast signal having PSIP-type SI and updates the channel information.

More specifically, in order to determine the type of SI of a broadcast signal, the digital broadcast receiver 100 may parse 0xFFB packet of the TS of the broadcast signal, and only determine that the SI is PSIP type when there is a VCT.

FIG. 4 is a flowchart which illustrates a method of updating channel information, in which the operation of selecting channel mode is further added to the method of FIG. 3.

With reference to FIG. 4, in operation of S410, a digital broadcast receiver 100 according to another exemplary embodiment, receives from the user a selection of channel mode.

The channel mode may include cable channel mode and VOD channel mode.

The cable channel mode is a mode in which only broadcast channels providing general digital cable broadcast services are organized as channels of the receiver. The VOD channel mode is a mode in which only broadcast channels providing VOD services are organized as channels of the receiver.

Meanwhile, the digital broadcast receiver 100 may have default mode in which both the cable channels and the VOD channels are organized as channels of the receiver. When the user selects neither the cable channel mode nor the VOD channel mode, the digital broadcast receiver 100 may operate in the default mode.

In operation of S420, the digital broadcast receiver 100 receives a plurality of broadcast signals. In operation of S430, the digital broadcast receiver 100 scans the plurality of broadcast signals in a predetermined cycle, and acquires SI of the plurality of broadcast signals.

In operation of S440, after acquiring the SI, the digital broadcast receiver 100 selects a broadcast signal having a preset type of SI from among the acquired SI and updates the channel information. In this case, the digital broadcast receiver 100 may select a broadcast signal according to the type of SI corresponding to the selected channel mode and may update the channel information.

When the cable channel mode is selected, the digital broadcast receiver 100 may select a broadcast signal having PSIP-type information and may update the channel information.

When the VOD channel mode is selected, the digital broadcast receiver 100 may select a broadcast signal only having PSI-type information and update the channel information.

The methods for updating channel information using a digital broadcast receiver as shown in FIGS. 3 and 4 may be executed by digital broadcast receivers having the configurations as shown in FIGS. 1 and 2 and also by display apparatuses having other configurations.

Figure 5:
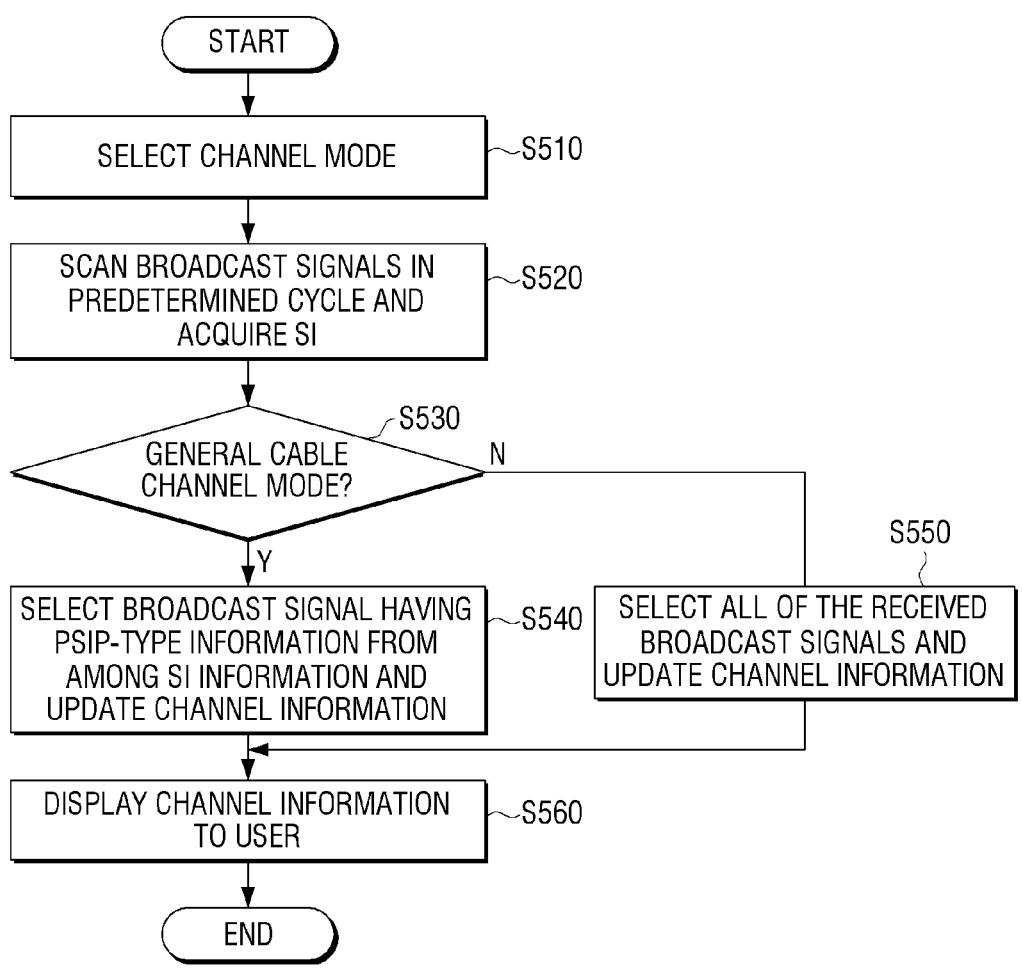
FIG. 5 is a flowchart which illustrates a method of updating channel information using a digital broadcast receiver, according to yet another exemplary embodiment.

FIG. 5 is a flowchart which illustrates a method of updating channel information using a digital broadcast receiver, according to yet another exemplary embodiment.

With reference to FIG. 5, in operation of S510, a digital broadcast receiver 100 according to yet another exemplary embodiment, receives from the user a selection of channel mode.

The channel mode may include cable channel mode, VOD channel mode and a default mode.

The cable channel mode is a mode in which only broadcast channels providing general digital cable broadcast services are organized as channels of the receiver. The VOD channel mode is a mode in which only broadcast channels providing VOD services are organized as channels of the receiver.

The digital broadcast receiver 100 may have the default mode in which both the cable channels and the VOD channels are organized as channels of the receiver. When the user selects neither the cable channel mode nor the VOD channel mode, the digital broadcast receiver 100 may operate in the default mode.

In operation S520, the digital broadcast receiver 100 scans a plurality of received broadcast signals in a predetermined cycle, and acquires SI related to the plurality of broadcast signals.

After acquiring the SI, in response to the selected channel mode being the cable channel mode in operation of S530: YES, the digital broadcast receiver 100 selects a broadcast signal having PSIP-type information and updates channel information in operation S540.

Alternatively, when the selected channel mode is not the cable channel mode in operation of S530: NO, the digital broadcast receiver 100 selects all of the received broadcast signals and updates channel information in operation of S550.

The channel information may be updated using EPG information of the acquired SI.

In operation of S560, the digital broadcast receiver 100 displays the updated channel information to the user. The user may select a broadcast channel to view using the displayed channel information.

The method for updating channel information as shown in FIG. 5 may be executed by digital broadcast receivers having the configurations as shown in FIGS. 1 and 2 and also by display apparatuses having other configurations.

In view of the above, according to the diverse exemplary embodiments, channels are provided by selecting a broadcast signal according to the type of SI of the received broadcast signal so that reception of unintended broadcast services may be prevented and broadcast channels selected by the user may be appropriately reproduced.

The methods according to the diverse exemplary embodiments may be programmed and stored in diverse storage media. Accordingly, diverse types of digital broadcast receivers which execute such storage media may realize the methods according to the diverse exemplary embodiments.

In addition, the methods for updating channel information may be implemented with a program including an algorithm which is executable by digital broadcast receivers, and may be stored and provided in a non-transitory computer readable medium.

A non-transitory computer readable medium is a medium which does not store data temporarily such as a register, cash, and memory but stores data semi-permanently and is readable by devices. More specifically, the aforementioned diverse applications or programs may be stored and provided in a non-transitory computer readable medium such as a compact disk (CD), digital video disk (DVD), hard disk, Blu-ray disk®, universal serial bus (USB), memory card, and read-only memory (ROM).

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A digital broadcast receiver comprising:
    a receiver configured to receive a plurality of broadcast signals corresponding to a plurality of broadcast channels;
    a channel scanner configured to acquire service information (SI) related to the plurality of broadcast channels;
    a controller configured to select a type of SI, from among program specific information (PSI)-type information and program service information protocol (PSIP)-type information, and to display channel information based on the selected type of SI; and
    a signal processor configured to receive and process only a broadcast signal of a channel of the selected type of SI and output a broadcast channel based on the processed broadcast signal,
    wherein, in response to the PSI-type information being the selected type of SI, the signal processor is configured to output only the broadcast channel having the PSI-type information and the controller is configured to display the channel information, including the broadcast channel having the PSI-type information and not including a broadcast channel having the PSIP-type information.

2. The digital broadcast receiver as claimed in claim 1, wherein the channel scanner acquires the service information by scanning the plurality of broadcast signals in a predetermined cycle.

3. The digital broadcast receiver as claimed in claim 1, further comprising:
    a user interface configured to receive a selection of channel mode,
    wherein the controller is configured to update the channel information by selecting a broadcast channel according to a type of SI which corresponds to the selected channel mode.

4. The digital broadcast receiver as claimed in claim 3, wherein the channel mode comprises cable channel mode and video on demand (VOD) channel mode.

5. The digital broadcast receiver as claimed in claim 4, wherein in response to the cable channel mode being selected, the controller updates the channel information corresponding to the broadcast channel having the PSIP-type information.

6. The digital broadcast receiver as claimed in claim 4, wherein when the VOD channel mode is selected, the controller updates the channel information corresponding to the broadcast channel having the PSI-type information.

7. The digital broadcast receiver as claimed in claim 1, wherein the receiver comprises:
    a tuner configured to tune the plurality of broadcast signals; and
    a demodulator configured to demodulate the plurality of tuned broadcast signals.

8. A method of updating channel information using a digital broadcast receiver, the method comprising:
    receiving a plurality of broadcast signals corresponding to a plurality of broadcast channels;
    acquiring service information (SI) related to the plurality of broadcast signals by scanning the plurality of broadcast channels; and
    selecting a type of SI, from among program specific information (PSI)-type information and program service information protocol (PSIP)-type information, and displaying channel information based on the selected type of SI; and
    processing only a broadcast signal of a channel of the selected type of SI and outputting a broadcast channel based on the processed broadcast signal,
    wherein, in response to the PSI-type information being the selected type of SI, the outputting comprises outputting only the broadcast channel having the PSI-type informaiton and the displaying the channel information comprising displaying the channel information, including a broadcast channel having the PSI-type information and not including a broadcast channel having the PSIP-type information.

9. The method as claimed in claim 8, wherein in the acquiring service information (SI), the plurality of broadcast signals is scanned in a predetermined cycle.

10. The method as claimed in claim 8, further comprising:
    receiving a selection of channel mode,
    wherein in the updating operation, the channel information is updated by selecting a broadcast channel according to a type of SI which corresponds to the selected channel mode.

11. The method as claimed in claim 10, wherein the channel mode comprises cable channel mode and video on demand (VOD) channel mode.

12. The method as claimed in claim 11, wherein in the updating operation, in response to the cable channel mode being selected, the channel information is updated corresponding to the broadcast channel having the PSIP-type information.

13. The method as claimed in claim 11, wherein in the updating operation, in response to the VOD channel mode being selected, the channel information is updated corresponding to the broadcast channel having the PSI-type information.

14. The method as claimed in claim 8, wherein the receiving operation comprises:
    tuning the plurality of broadcast signals; and
    demodulating the plurality of tuned broadcast signals.

15. A non-transitory computer readable storage medium configured to be implemented by a processor of a computer, causing the computer to perform a method of updating channel information using a digital broadcast receiver, the method comprising:
    receiving a plurality of broadcast signals corresponding to a plurality of broadcast channels;
    acquiring service information (SI) of the plurality of broadcast signals by scanning a plurality of broadcast channels in a predetermined cycle; and
    selecting a type of SI, from among program specific information (PSI)-type information and program service information protocol (PSIP)-type information, and displaying channel information based on the selected type of SI, processing only a broadcast signal of a channel of the selected type of SI and outputting a broadcast channel based on the processed broadcast signal, wherein in response to the PSI-type information being the selected type of SI, the outputting comprises outputting only the broadcast channel having the PSI-type information and the displaying the channel information comprising displaying the channel information, including a broadcast channel having the PSI-type information and not including a broadcast channel having the PSIP-type information.

16. The digital broadcast receiver as claimed in claim 1, wherein the controller is configured to display the channel information, including the broadcast channel having the PSIP-type information and not including the broadcast channel having the PSI-type information, in response to the PSIP-type information being the selected type of SI.

17. The method as claimed in claim 8, wherein the displaying the channel information comprising displaying the channel information, including the broadcast channel having the PSIP-type information and not including the broadcast channel having the PSI-type information, in response to the PSIP-type information being the selected type of SI.

18. The non-transitory computer readable storage medium as claimed in claim 15, wherein the displaying the channel information comprising displaying the channel information, including the broadcast channel having the PSIP-type information and not including the broadcast channel having the PSI-type information, in response to the PSIP-type information being the selected type of SI.

19. The digital broadcast receiver as claimed in claim 1, wherein the signal processor comprises a de-multiplexer configured to de-multiplex a transport stream of the broadcast signal, and the controller is configured to control an operation of the de-multiplexer based on the selected type of SI.

* * * * *